United States Patent
Tsui et al.

(10) Patent No.: US 7,685,143 B2
(45) Date of Patent: Mar. 23, 2010

(54) UNIFIED LOGGING SERVICE FOR DISTRIBUTED APPLICATIONS

(75) Inventors: Alex K. Tsui, Markham (CA); Paul (Ming) Chen, Markham (CA); Michael G. Polan, Markham (CA); Arnold Rosen, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1447 days.

(21) Appl. No.: 10/730,656

(22) Filed: Dec. 8, 2003

(65) Prior Publication Data

US 2004/0167912 A1 Aug. 26, 2004

(30) Foreign Application Priority Data

Feb. 20, 2003 (CA) .................................... 2419305

(51) Int. Cl.
G06F 17/00 (2006.01)
(52) U.S. Cl. .................... 707/101; 707/100; 707/104.1; 709/223
(58) Field of Classification Search ................ 707/100, 707/3, 101, 104.1; 709/223, 229
See application file for complete search history.

(56) References Cited

U.S. PATENT DOCUMENTS

| 5,857,190 | A | | 1/1999 | Brown ......................... 707/10 |
|---|---|---|---|---|
| 5,982,995 | A | * | 11/1999 | Covert et al. ............... 358/1.15 |
| 6,119,079 | A | | 9/2000 | Wang et al. .................... 704/8 |
| 6,125,392 | A | * | 9/2000 | Labatte et al. .............. 709/224 |
| 6,219,701 | B1 | * | 4/2001 | Hirata et al. ................ 709/223 |
| 6,230,210 | B1 | * | 5/2001 | Davies et al. ............... 709/248 |
| 6,247,149 | B1 | * | 6/2001 | Falls et al. .................... 714/45 |
| 6,594,786 | B1 | * | 7/2003 | Connelly et al. ............. 714/50 |
| 2002/0078381 | A1 | * | 6/2002 | Farley et al. ................ 713/201 |
| 2003/0055808 | A1 | * | 3/2003 | Bhat ............................. 707/1 |
| 2004/0172284 | A1 | * | 9/2004 | Sullivan et al. ................ 705/2 |
| 2005/0228796 | A1 | * | 10/2005 | Jung ........................... 707/10 |

OTHER PUBLICATIONS

"IBM WebSphere Business Integrator", An Inter- and Intra-Enterprise Integration Platform pp. 1-12., May 11, 2001.

* cited by examiner

Primary Examiner—Don Wong
Assistant Examiner—Angela M Lie
(74) Attorney, Agent, or Firm—Joseph E. Bracken, Esq.; Steven M. Greenberg, Esq.; Carey, Rodriguez, Greenberg & Paul, LLP

(57) ABSTRACT

A unified logging service is provided which may be employed across a variety of applications, allowing collected information to be stored, aggregated, and accumulated; presenting a more complete view, than previously available, related to those applications. The unified logging service provides a generalized centralized web services based service with the capability of accepting and collecting a variety of log formats containing a variety of logged events. These events may originate from clients using differing log formats or types in a heterogeneous distributed computing environment. Acknowledgement of receipt of log files may be provided to the originating clients. A log routing capability is also provided as well as a central repository for storing and forwarding log messages flowing throughout the system. These services may be accessed locally or remotely via published web services interfaces.

22 Claims, 14 Drawing Sheets

FIG. 9

```xml
<logTypes>
    <logType>
        <name>Error</name>
        <renderer>com.ibm.hosting.commonLogClientImpl.ErrorLogMessageRenderer</renderer>
        <handlers>
            <handler>
                <name>LogFileHandler</name>
                <enable>true</enable>
            </handler>
        </handlers>
    </logType>
    <logType>
        <name>Metering</name>
        <renderer>com.ibm.hosting.commonLogClientImpl.MeteringLogMessageRenderer</renderer>
        <handlers>
            <handler>
                <name>LogConsoleHandler</name>
                <enable>true</enable>
            </handler>
            <handler>
                <name>MeteringLogHandler</name>
                <enable>true</enable>
            </handler>
            <handler>
                <name>LogBillingHandler</name>
                <enable>true</enable>
            </handler>
            <handler>
                <name>LogFileHandler</name>
                <enable>true</enable>
            </handler>
        </handlers>
    </logType>
```

FIG. 9 contd.

```
<logType>
    <name>Audit</name>
    <renderer>com.ibm.hosting.commonLogClientImpl.AuditLogMessageRenderer</renderer>
    <handlers>
        <handler>
            <name>LogConsoleHandler</name>
            <enable>true</enable>
        </handler>
        <handler>
            <name>LogFileHandler</name>
            <enable>true</enable>
        </handler>
        <handler>
            <name>AuditLogHandler</name>
            <enable>true</enable>
        </handler>
    </handlers>
</logType>
<logType>
    <name>Message</name>
    <renderer>com.ibm.hosting.commonLogClientImpl.MessageLogMessageRenderer</renderer>
    <handlers>
        <handler>
            <name>MessageLogHandler</name>
            <enable>true</enable>
        </handler>
    </handlers>
</logType>
</logTypes>
```

FIG. 10

```
ServiceContextInfo ctx = new ServiceContextInfo();
ctx.setCredentials(userCredentials);
ctx.setForUser(userID);

//Construct the log header
LogHeaderInfo header = new LogHeaderInfo();
header.setLogSystemType(logSystemType);
header.setLogType("Audit");
header.setServerName(InetAddress.getLocalHost().getHostName());
header.setLogCreateTime(new Date() );

//Construct the audit log message body
AuditLogMessageInfo message = new AuditLogMessageInfo();
message.setEventType("Test Event Type");
message.setOrganizationName("o=alice0814b,dc=allegro");
message.setServiceName("Test Service Name");
message.setLogOnName("uid=spadmin,dc=users,dc=allegro");

//Instantiate the Audit Log Adapter
CommonLogClientAuditLogAdapter adapter = new CommonLogClientAuditLogAdapter();
adapter.setServiceContext(ctx);
adapter.setLogHeader(header);
```

FIG. 11

```
//Call the Common Logging Service client stub
com.ibm.hosting.clientStub.commonLog.CommonLog service =
        new com.ibm.hosting.clientStub.commonLog.CommonLog();

// Now use the service to get a PortType that we can call.
java.net.URL myURL =
        new java.net.URL("http://localhost:8080/commonLog/services");
CommonLogPortType port = service.getCommonLogPort(myURL, "commonLog");

com.ibm.hosting.model.commonLog.CommonLogInfo commonLogInfo =
        new com.ibm.hosting.model.commonLog.CommonLogInfo();
commonLogInfo.setLogHeader(logHeader);
commonLogInfo.setLogMessage(logMessage);

boolean a = port.createLog(commonLogInfo);
System.out.println("return value:" + a);
```

FIG. 12

```xml
<?xml version="1.0" ?>
<commonLog>
  <logHandlers>
    <logHandler>
      <name>LogConsoleHandler</name>
      <class>com.ibm.hosting.service.commonLogImpl.LogConsoleHandler</class>
    </logHandler>
    <logHandler>
      <name>LogBillingHandler</name>
      <class>com.ibm.hosting.service.commonLogImpl.LogBillingHandler</class>
    </logHandler>
    <logHandler>
      <name>LogDBHandler</name>
      <class>com.ibm.hosting.service.commonLogImpl.LogDBHandler</class>
    </logHandler>
  </logHandlers>
</logHandlers>

<logTypes>
  <logType>
    <name>Billing</name>
    <renderer>com.ibm.hosting.service.decode.AuditLogRenderImpl</renderer>
    <handlers>
      <handler>
        <name>LogConsoleHandler</name>
        <enable>true</enable>
      </handler>
      <handler>
        <name>LogDBHandler</name>
        <enable>true</enable>
      </handler>
      <handler>
        <name>LogBillingHandler</name>
        <enable>true</enable>
      </handler>
    </handlers>
  </logType>
```

FIG. 12 contd.

```
<logType>
  <name>Audit</name>
  <renderer>com.ibm.hosting.service.decode.AuditLogRenderImpl</renderer>
  <handlers>
    <handler>
      <name>LogConsoleHandler</name>
      <enable>true</enable>
    </handler>
    <handler>
      <name>LogDBHandler</name>
      <enable>true</enable>
    </handler>
  </handlers>
</logType>
</logTypes>

<logFilter>
  <serverNames>
    <serverName>abc.xyz.com</serverName>
    <serverName>pqr.xyz.com</serverName>
  </serversNames>
  <logSystemTypes>
    <logSystemType>Metering Service</logSystemType>
    <logSystemType>WAS JRas</logSystemType>
  </logSystemTypes>
  <logTypes>
    <logType>Unknown</logType>
    <logType>Billing</logType>
    <logType>Trace</logType>
  </logTypes>
</logFilter>
</commonLog>
```

UNIFIED LOGGING SERVICE FOR DISTRIBUTED APPLICATIONS

FIELD OF THE INVENTION

This present invention relates generally to the logging of events generated by computer applications, and more particularly to the unified logging of events generated by computer applications distributed across a network.

BACKGROUND

Event logging has been known since the early days of sailing. Today in computer based systems and applications the idea of logging has taken new meaning. The recording of event occurrence information is the act of logging. The data captured is placed in storage devices and later processed in a variety of ways. The processing typically involves problem determination, recovery or statistical analysis to derive information related to system as well as application usage or behaviour.

Some computer systems include logging services to maintain system specific information. Such information may be stored on a local device for later use. Cases of remote logging are also known wherein the log information is transmitted over a network and stored at a location remote from the source of the logged event. Remote logging requires the knowledge of host system information to keep track of the source.

Applications which operate on top of system operating systems also create events and record the occurrence of such events. These log files are created and maintained for the purpose of monitoring application activity and status of components or other objects and activities important to the operation of the application and the care of the data created. Application log files tend to be application specific in content and format. These log files as in the case with system log files tend to be created and maintained in close proximity to the source. When such log files are remote they have the same requirements as do the system based log files, that is the identification of the source of the information which includes some form of network addressing.

Even when log files are collected from remote locations the collected log files are maintained in the same form as they were created. This creates islands of log data wherein each island is tailored to a specific kind or format of log. Interface requirements of each log type are known and required to input and extract information from the respective log files.

The uniqueness of the log file across applications and systems causes operational concerns as system and application administrators cope with the varying requirements. The uniqueness also inhibits the data sharing across log types or formats. Problems requiring data from multiple log sources typically requires the involvement of multiple people each having skill in interpreting and working with particular logs or log formats. For example an application problem may be resolved after investigating the system, application and network logs; each involving a separate person and set of tools.

As the data formats of the various logs differ so have the tools used to maintain and report on log data. Additional tools require more time and money to acquire and maintain as well as get training.

BRIEF SUMMARY OF THE INVENTION

Conveniently, software exemplary of the present invention allows the collection of specific information associated with an application or a system, such as the transactional information of an application collected in the form of log files to be gathered in a location which may be separate from the location of the source and combined with a similar type of information from other dissimilar sources.

Advantageously, the technique may be employed across a variety of applications, allowing collected information to be stored, aggregated, and accumulated; presenting a more complete view related to those applications.

The unified logging service is provided as a generalized, centralized web based service. This service has the capability of accepting and collecting a variety of log formats containing a variety of logged events. These events may originate from clients using differing log formats or types in a heterogeneous distributed computing environment.

A log routing capability is also provided as well as a central repository for storing and forwarding log messages flowing throughout the system.

These services may be accessed locally or remotely via published web services interfaces. There are typically no restrictions on the common format of the stored log information or consistent interfaces of the logging service. This allows the handling of different logs in different formats under different computing environments. XML has been used to provide the flexibility required to transform log objects as they enter and leave the unified logging service, making these objects more portable and compatible than before.

In a hosting service platform various types of logs are typically generated from the hosted applications and services as well as from the actual components of the hosting system platform itself. A unified logging service must therefore be versatile to handle the variety of log formats encountered. This unified logging service is designed to provide a generalized service with a logging interface for viewing the logs from various log clients where these clients were the originators of the logged events.

The specific log formats generated by the log clients can be restructured using log adapters and log renderers. The log adapters and renderers are paired to work in conjunction with specific log formats using XML based services to format log information for transmission into and out of the unified log service. Processing of the received log file by the unified log service uses the same log renderers to restructure the log file for return to the original specific log format.

Using a well known publish and subscribe mechanism allows differing log type to be identified and routed to the appropriate log handler that has subscribed to those types of logs previously. Through the use of different log handlers the log files can be forwarded to other log system or stored in a log file repository.

In one aspect of the invention there is provided a method of providing a unified logging service, for use in a network having a plurality of nodes capable of generating event logs, wherein the unified logging service having a unified log server and repository, comprising the steps of converting an event log file of a first log type and structure associated with a sending node into a predefined format and transmitting the converted event log file over said network to said unified log server. The unified log server receiving the converted event log file, determining the log type of the converted log file and routing the converted log file to a log handler compatible with the log type and the predefined format. Identifying a receiving node compatible with the log type for the converted event log file, and forwarding the converted event log file from the log handler to the identified receiving node.

In another aspect of the invention, there is provided an apparatus for providing a unified logging service, used with event log files having a first log type and structure, for use in a network having a plurality of nodes capable of generating event log files, comprising a unified logging server, means for receiving said event log file at said unified logging server, a log adapter for converting said event log file from said first protocol to a predefined format, means for determining a log type of said converted event log file and a log handler suitable for said log type, means for forwarding said converted event log file to said log handler, means for identifying a receiving node, and means for forwarding said converted event log file to said identified receiving node.

In yet another aspect of the invention, there is provided a system for providing a unified logging service, for use in a network having a plurality of nodes capable of generating event logs, wherein the unified logging service having a unified log server and repository, comprising a sending node having a first log type and structure, an event log file having a first log type associated with the sending node, a log adapter for the sending node for converting the event log file from the first protocol to a predefined format, and means for transmitting the converted event log file across the network to the unified logging server. Additionally, means for receiving the converted event log file at the unified logging server, means for determining the log type of said converted event log file and a log handler suitable for the log type, means for forwarding the converted event log file to the log handler, means for identifying a receiving node for the converted event log file, and means for forwarding said converted event log file to the identified receiving node.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate embodiments of the present invention by example only.

FIG. 9 is a code example of definitions associating a log type to an internal processing format of exemplary embodiment of FIG. 3;

FIG. 10 is a code example of invoking a web service interface in an embodiment of a unified log server of FIG. 3;

FIG. 11 is a code example of adapter code in an embodiment of a unified log server of FIG. 3; and FIG. 12 is a code example of a configuration file of a unified log server of FIG. 3.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as methods, systems, and/or software products. Accordingly, the present invention may be embodied in software (including firmware, resident software, micro-code, etc.). Furthermore, the present invention may take the form of a software product on a processor-usable or processor-readable storage medium having processor-usable or processor readable program code embodied in the medium for use by or in connection with an instruction execution system. In the context of this document, a processor-usable or processor readable medium may be any medium that can contain, store, communicate, propagate, or transport the software for use by or in connection with the instruction execution system, apparatus, or device including a network of such devices.

Figure 1:
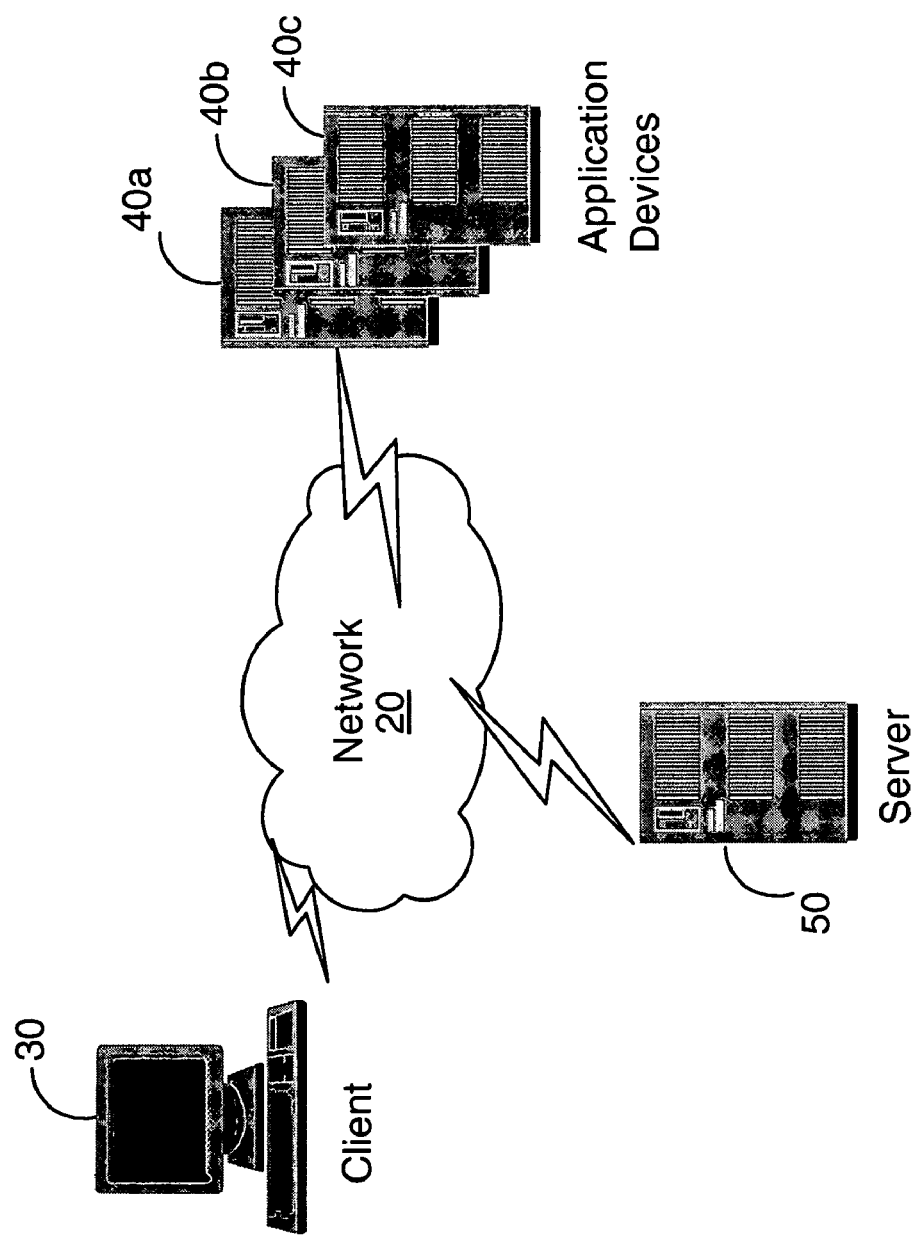
FIG. 1 is a hardware overview of a network including at least one unified log server for collecting heterogeneous log information, several application computing devices, and at least one client computing device, exemplary of embodiments of the present invention.

FIG. 1 illustrates an exemplary data communications network 20, interconnected with a server 50, in communication with a plurality of computing devices 40a, 40b and 40c (individually and collectively devices 40), exemplary of embodiments of the present invention. A client computing device 30 in communication with network 20 to establish communication with server 50 is also illustrated. Computing devices 40 and client computing device 30 are differing examples of sending and receiving nodes. Determination of being a sending or a receiving node is based on the circumstance of communication with server 50.

Computing devices 40, client computing device 30 and data collection server 50 are all conventional computing devices, each including a processor and computer readable memory storing an operating system and software applications and components for execution.

Network 20 may for example be a conventional local area network that adheres to suitable network protocol such as the Ethernet, token ring or similar protocols. Alternatively, the network protocol may be compliant with higher level protocols such as the Internet protocol (IP), Appletalk, or IPX protocols. Similarly, network 20 may be a wide area network, or the public internet.

Client computing device 30 is a network aware computing device, providing an end-user interface that allows an end-user to exchange and view information stored at server 50.

Computing devices 40 are computing devices storing and executing data processing, data storage or similar applications. Often such computing devices are referred to as application servers. As will become apparent, applications at each device 30 and 40 store data such as log files for their own use and processing, typically on computer storage memory at devices 30 and 40.

Server 50 collects log file information from computing devices 30 and 40, by way of component software stored and executing at computing devices 30 and 40. Collected information is stored at server 50 for viewing and analysis, for example by way of client computing devices 30 and 40.

Figure 2:
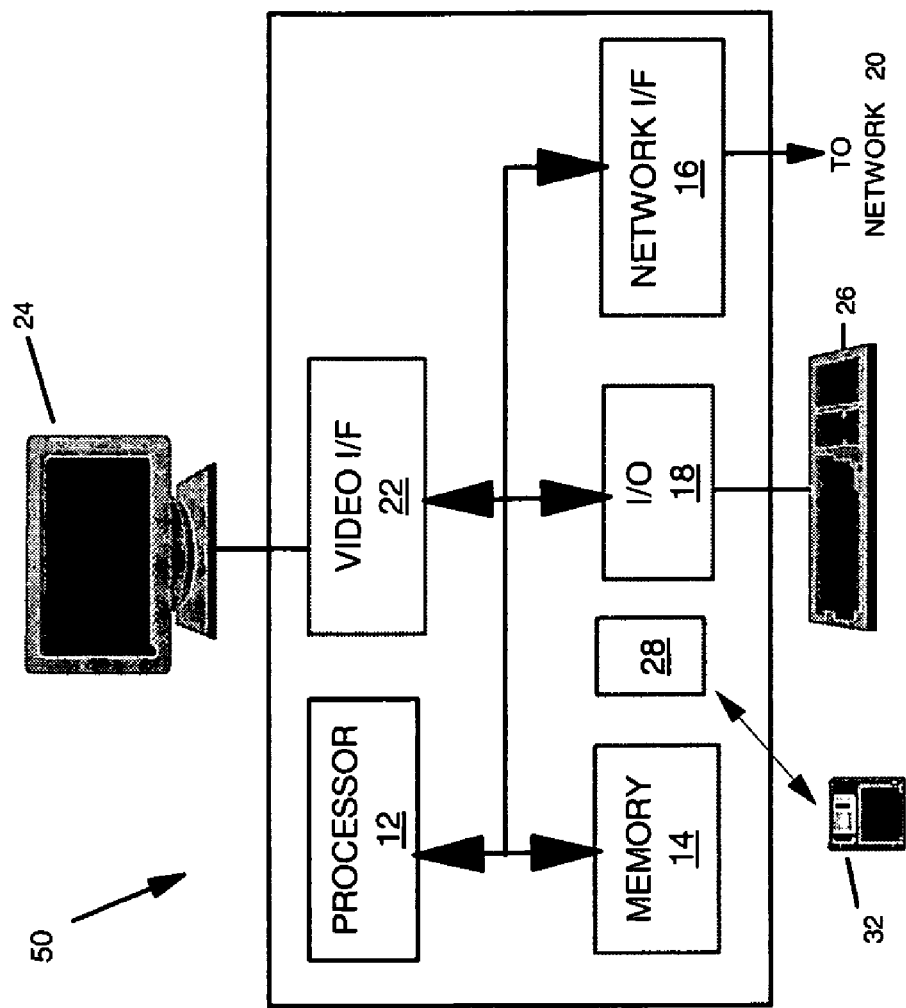
FIG. 2 illustrates exemplary hardware architecture of a unified log server of FIG. 1.

Simplified preferred hardware architecture of an example computing device 50 is schematically illustrated in FIG. 2. In the illustrated embodiment, device 50 is a conventional network capable server. Device 50 could, for example, be an Intel x86 based computer acting as a Microsoft Windows NT, Apple, or Unix based server, workstation, personal computer or the like. Example device 50 includes a processor 12, in communication with computer storage memory 14; network interface 16; input output interface 18; and video adapter 22. As well, device 50 may optionally include a display 24 interconnected with adapter 22; input/output devices, such as a keyboard 26 and disk drive 28 and a mouse (not shown) or the like. Processor 12 is typically a conventional central processing unit, and may for example be a microprocessor in the INTEL x86 family. Of course, processor 12 could be any other suitable processor known to those skilled in the art. Computer storage memory 14 includes a suitable combination of random access memory, read-only-memory, and disk storage memory used by device 12 to store and execute software programs adapting device 12 to function in manners exemplary of the present invention. Drive 28 is capable of reading and writing data to or from a computer readable medium 32 used to store software and data to be loaded into memory 14. Computer readable medium 32 may be a CD-ROM, diskette, tape, ROM-Cartridge or the like or other large capacity storage. Network interface 26 is any interface suitable to physically link device 10 to network 16. Interface 26 may, for example, be an Ethernet, ATM, ISDN interface or modem that may be used to pass data from and to network 20 or another suitable communications network.

The hardware architectures of computing devices 40 and client computing device 30 are materially similar to that of server 50, and will therefore not be further detailed.

Figure 3:
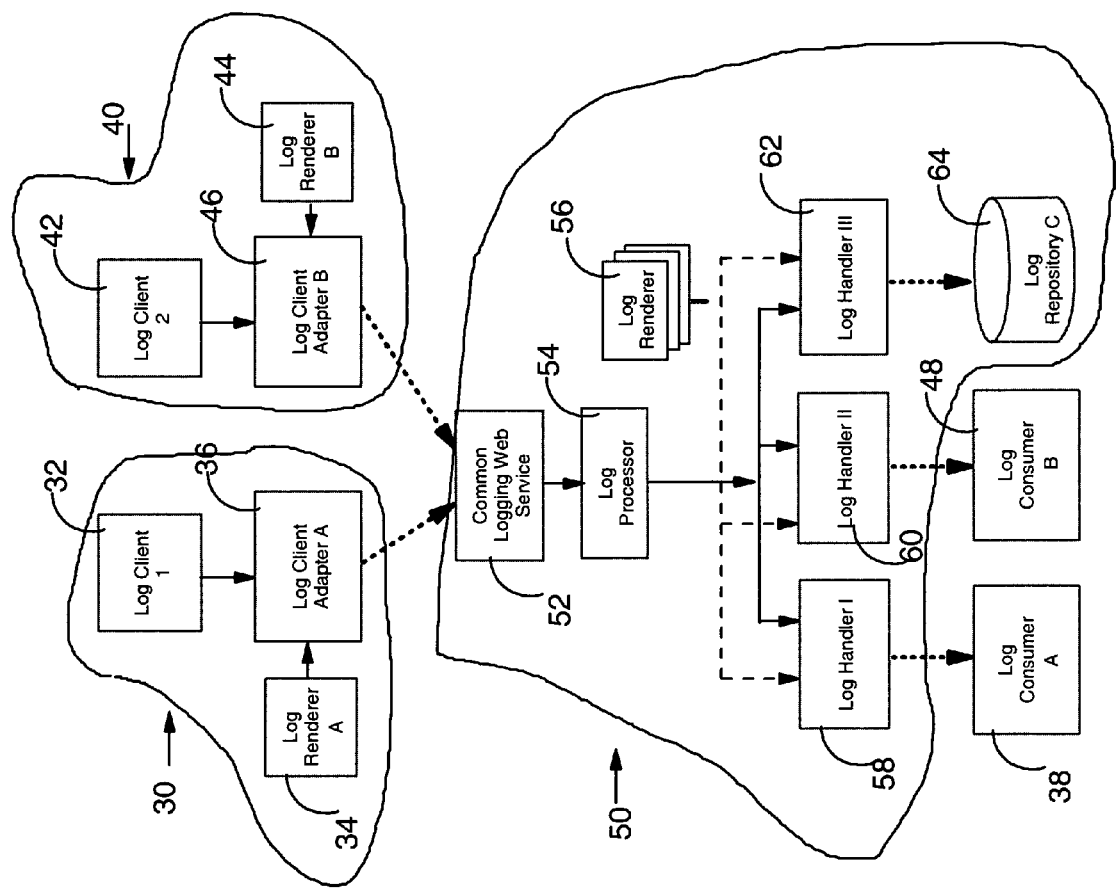
FIG. 3 illustrates a first exemplary software architecture of a unified log server of FIG. 1.

FIG. 3 schematically illustrates first exemplary software architecture of a unified log server of FIG. 1.

Client 30 is shown comprising log client 32, log renderer 34 and log adapter 36. Log renderer 34 and log client adapter 36 although shown in relation to client 30 need not be located with client 30 as they may be disposed at server 50 of FIG. 1. Log client 32 produces the events that are captured via logging means. Log renderer 34 is exemplary software used by log adapter 32 to format a particular log file into presentable format for log client 32. Log client adapter 36 is exemplary software that restructures log file data into a common format for transmission to unified logging service 50.

Client 40 is another embodiment of client 30, wherein client 40 comprises log client 42, having log adapter 44 using log renderer 46. Similar components function as set forth in describing client 30.

Log files move between client 30 and server 50 by means of the common logging web services 52 interface. Common logging service and unified logging service may be used interchangeably throughout the following description and is to be taken as meaning the same. The web services based logging interface is one that can be published to a public service directory for use with Universal Data Description and Interchange (UDDI). If client 30 has implemented log adapter 36 then a log file coming from client 30 would be prepared in a common log file format by log adapter 36. If log adapter 36 was not implemented at client 30 then the log file from client 30 would be transmitted to log adapter 36 implemented on server 50. A log file of client 30 would have a first log type and structure associated the file. Log adapter 36 would perform restructuring as required in accordance with the type of log and differences described between the source log format and the common log format of server 50. The unified log service can be public and subscribed to externally from the enterprise. There is also potential to provide the service as a billable service (user pay).

Log processor 54 has a capability of recognizing different log types and routing those identified logs to their respective log handlers. Log processor 54 may also perform log filtering based on log configuration information maintained on log server 50 and route processed logs to an appropriate log repository or forward to another log system. Log processing can be buffered at the sending end to batch the call to the log service for log creation enhancing throughput.

Log renderer 56 performs serialization of the log message body between XML format of the unified log file and the object structure of the specific event log files. A log renderer is required for each type of event log file to be supported. The service employs pairs of log handler/log renderers to handle specific formats which may be customized (user provided if one not previously available) for handling unlimited log types and log formats using XML as the message body.

Log handler 58 handles specific types of logs. They are used to display and store and forward log messages to differing destinations or target users. The log handlers process most of the log information in the log files.

Log consumers 38 and 48 are requesters or recipients of log file data. Log consumers 38 and 48 typically request log information in a "requester format" requiring conversion between the unified logging service format and the particular unique object structure of the requester. The conversion would be performed by the associated log handler 58 and log renderer 56.

Repository 64 is storage medium for containment of the log data in the unified format of the unified log server. The repository performs storage duties for store and forward needs as well as persistent storage. The storage medium may be searched to find specific information related to or held within the unified logs.

Figure 4:
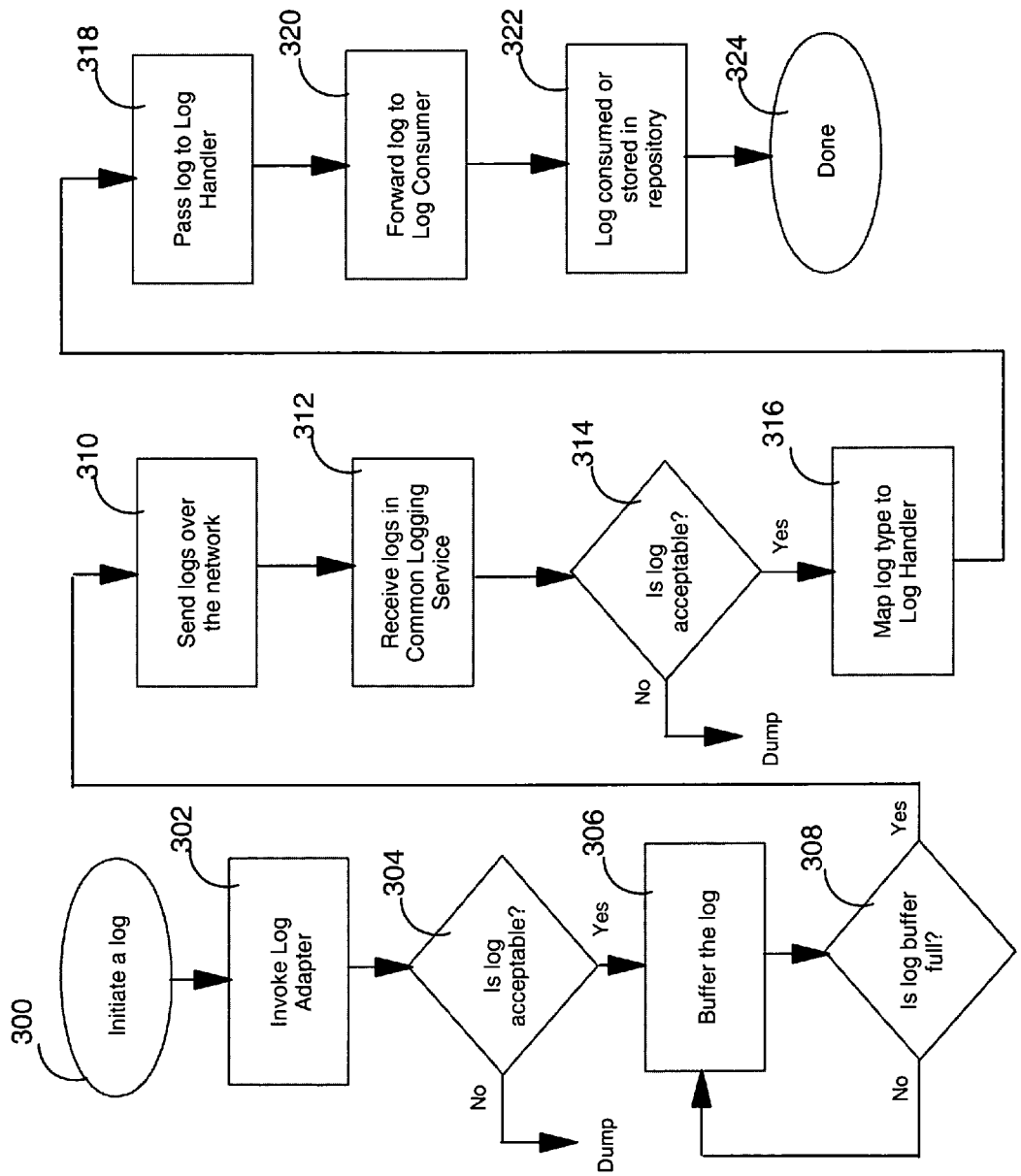
FIG. 4 illustrates a process flow of a unified log server of FIG. 3.

FIG. 4 illustrates a typical unidirectional flow of messages of the unified log server of FIG. 3. Beginning with step 300 a log creation is initiated by invocation of log adapter in 302. During 304 the log adapter is required to make a determination of the applicability of the log request with respect to the capability of the log adapter. If the log adapter cannot handle the request, the request and file are dumped. In this example log adapter 36 and log renderer 34 would be used in combination to reformat the log object from the sending node format or first structure into a predefined format of the common or unified logging service. In this manner the log renderer 34 functions much like a "plug-in" to log adapter 36 providing necessary function for the specific conversion required. A suitable request being made allows buffering of the log to begin in step 306. As buffering is performed checks are made in 308 to determine if the buffer is full. If not full more data is simply added. When the buffer is filled the data is transmitted in step 310. A corresponding receipt in step 312 on unified logging server 50 causes the converted log file to be available for processing. First in step 314 a determination is made as to whether the log received is supported by the unified logging server 50. If not the log is dumped, otherwise a determination is made in step 316 regarding the type of log to be processed and a corresponding log handler for that log type. Having made this determination in step 318 the log is sent to the indicated log handler. In step 320 the log handler determines which log consumer requested the log, processes the log according to the requester requirements and forwards the results to the target requester. During step 322 the requester consumes the log as requested or in the event no requester was found the data is stored for future use causing the instant action to cease at 324.

Figure 5:
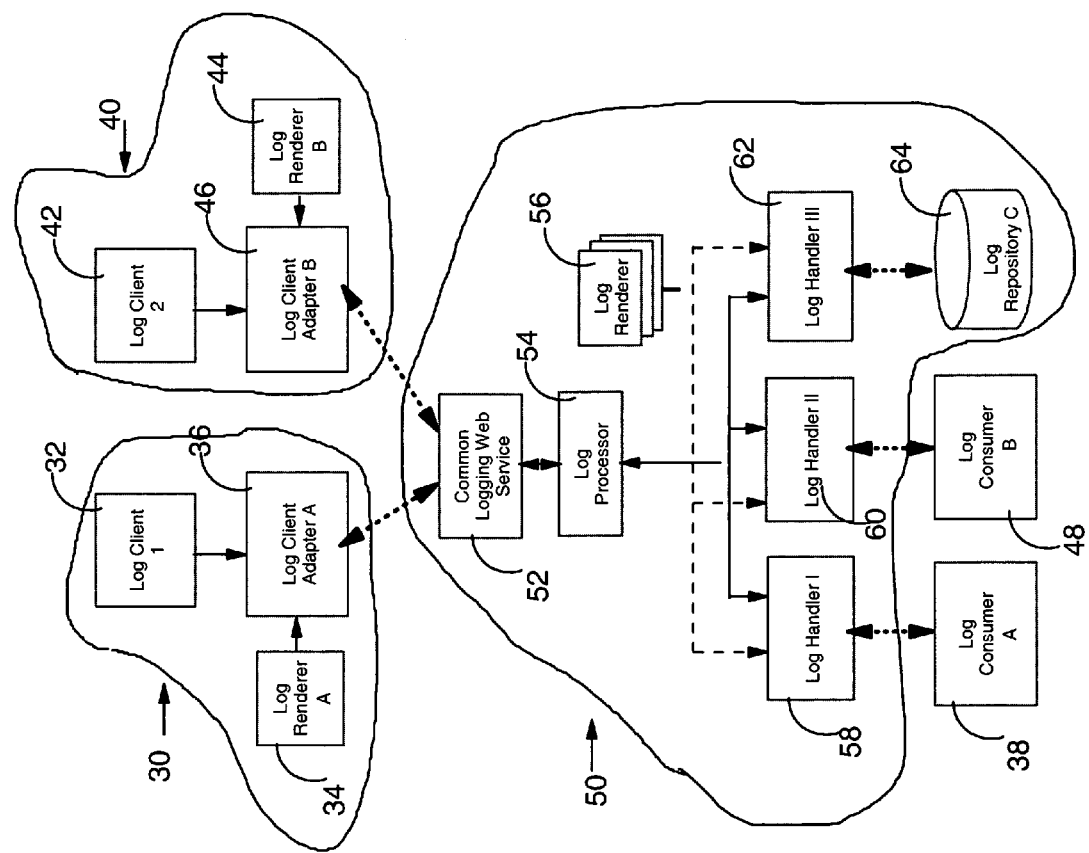
FIG. 5 illustrates a second exemplary software architecture of a unified log server of FIG. 1.

FIG. 5 is similar to FIG. 3 with the exception that the arrows denoting the path of messages throughout the service are bidirectional. FIG. 5 illustrates the capability of the unified logging service to process messages in more than a single direction. This bidirectional capability provides an opportunity to have a "dialog" between senders and "requesters" of log information. The components of FIG. 5 are similar to those of FIG. 3 and therefore will not be dealt with again.

Figure 6:
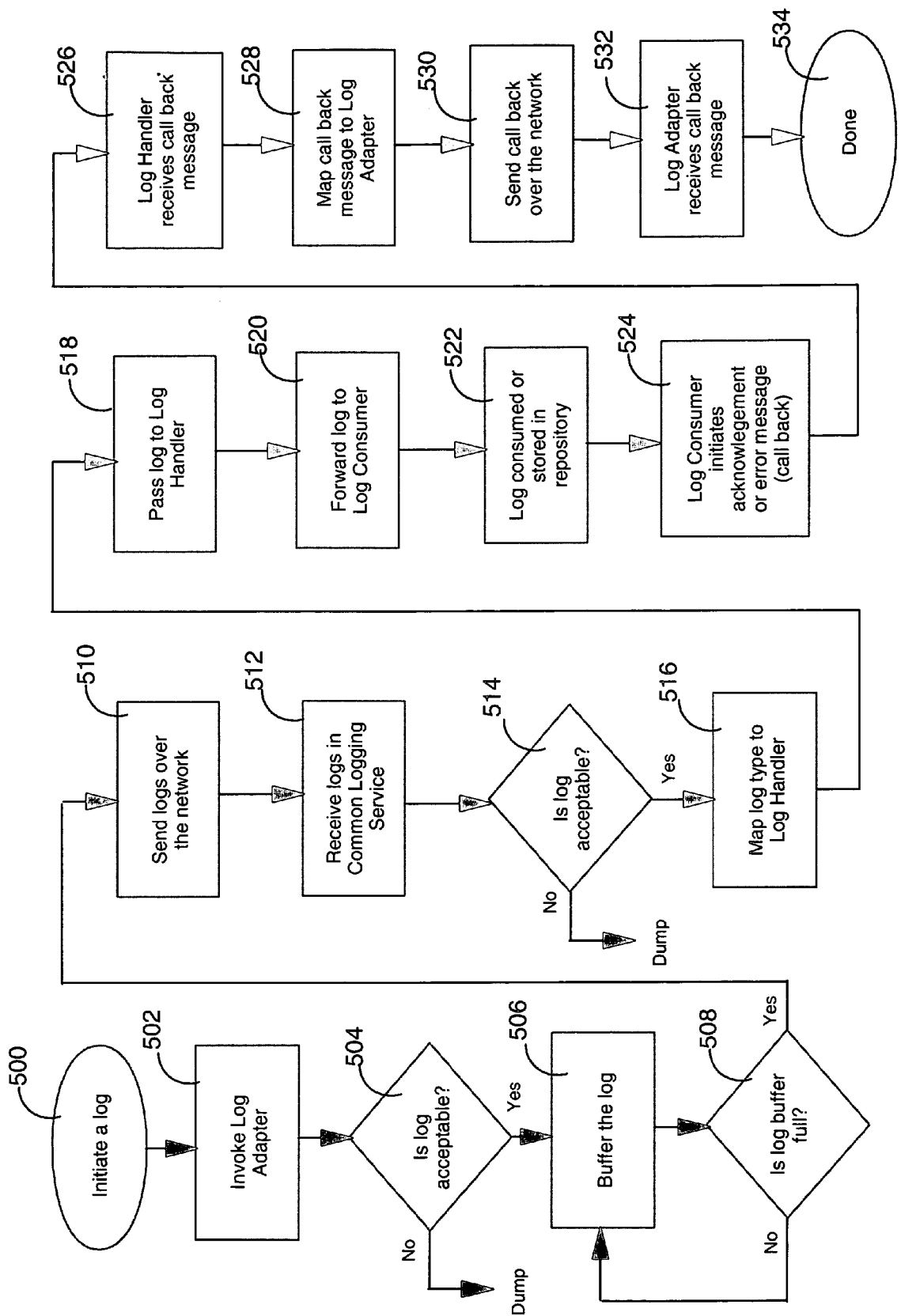
FIG. 6 illustrates a process flow of a unified log server of FIG. 5

FIG. 6 illustrates the flow of messages in two directions rather than the single direction of FIG. 4. Although the flow is explained from the top down through the service, it may be appreciated that the flow could also be initiated from the bottom to the top.

Beginning with step 500 a log creation is initiated by invocation of log adapter in 502. During 504 the log adapter is required to make a determination of the applicability of the log request with respect to the capability of the log adapter. If the log adapter cannot handle the request, the request and file are dumped. In this example log adapter 36, and log renderer 34 would be used in combination to reformat the log object from the sending node format or first structure into a predefined format of the common or unified logging service. In this manner the log renderer 34 functions much like a "plug-in" to log adapter 36 providing necessary function for the specific conversion required. A suitable request being made allows buffering of the log to begin in step 506. As buffering is performed checks are made in 508 to determine if the buffer is full. If not full more data is simply added. When the buffer is filled the data is transmitted in step 510. A corresponding receipt in step 512 on unified logging server 50 causes the converted log file to be available for processing. First in step 514 a determination is made as to whether the log received is supported by the unified logging server 50. If not the log is dumped, other wise a determination is made in step 516 regarding the type of log to be processed and a corresponding log handler for that log type. Having made this determination in step 518 the log is sent to the indicated log handler. In step 520 the log handler determines which log consumer requested the log, processes the log according to the requester requirements and forwards the results to the target requester. During step 522 the requester consumes the log as requested or in the event no requester was found the data is stored for future use. Departing from where the process of FIG. 4 stopped there is now step 524 in which the log consumer or recipient initiates an acknowledgement or call back message. If the call back message is in a format suitable for the log message format of the destination no conversion will be necessary, as in the case of a simple acknowledgment. Although not shown, the log consumer 38 may also have been configured to contain a log adapter 36 and log renderer 34 as in client 30 providing a capability to create more complex messages in a predefined format of the unified logging service. However if the format of the call back message is different than that of the destination node, conversion will have to be performed. Conversion to the destination node format will be performed by the log adapter and log renderer of the destination node to a first structure of the destination node. The log handler receives the call back in 526 and proceeds in 528 to determine the destination of the message by looking in the message header for target identifier of a log adapter. Having made the association in 528, the message is then sent in 530 to the identified log adapter. The message is received in 532 at the specified log adapter and the log client renderer is invoked to present the message. The flow terminates now at 534.

Figure 7:
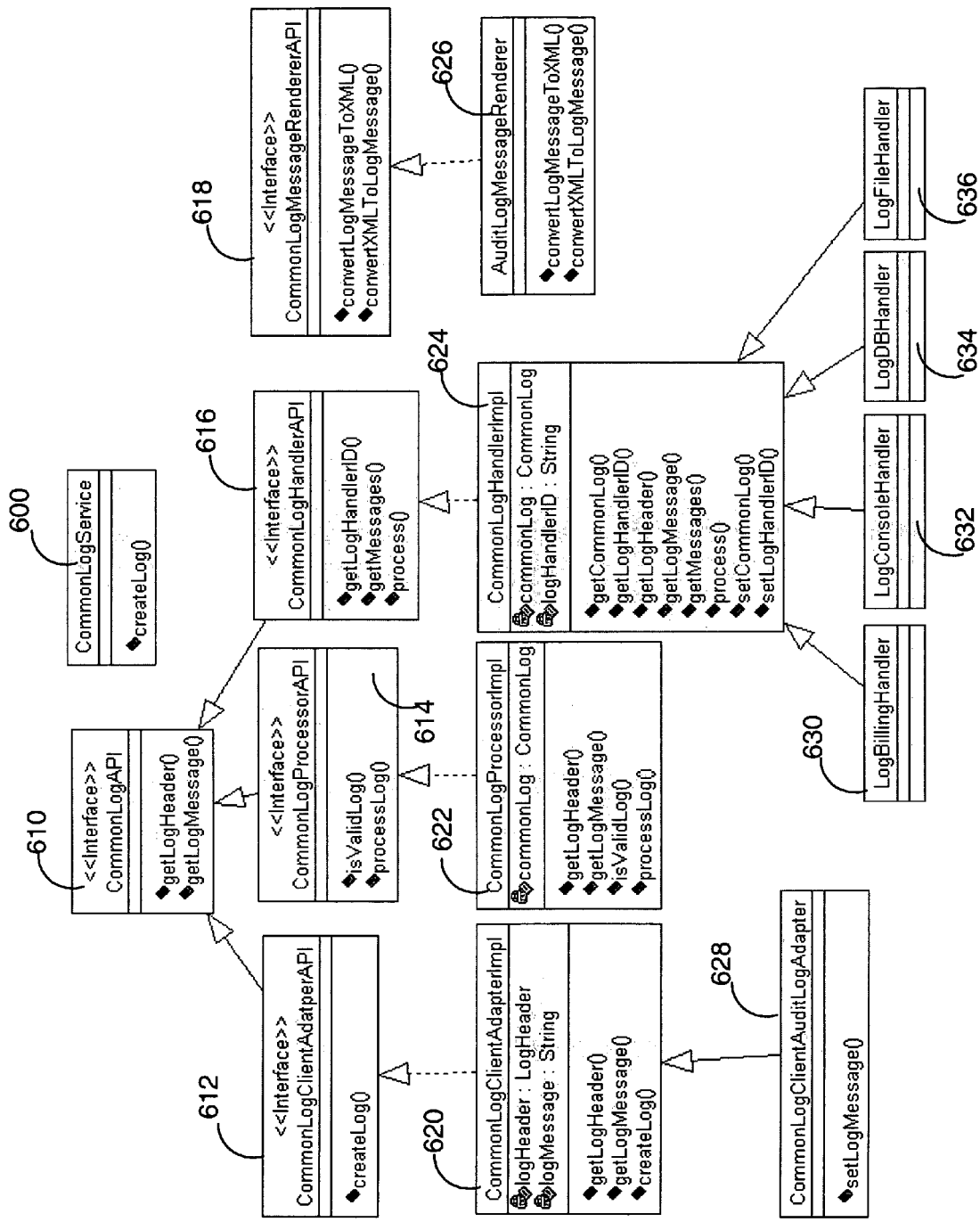
FIG. 7 is a class diagram of interface and implementation classes of an exemplary embodiment of a unified log server of FIG. 3.

Referring now to FIG. 7 is a class diagram of interface and implementation classes of an exemplary embodiment.

The parent interface for the unified logging service 600 is CommonLogAPI 610 defining the high level structure of a log used in the service. A log consists of a log header and a log message body. A log processor must be able to handle both parts of the log in which the header is common across log types and the body portion varies. A log handler may be capable of handling more than one type of log concurrently.

Interfaces CommonLogClientAdapterAPI, CommonLogProcessorAPI, and CommonLogHandlerAPI, 612, 614 and 616 respectively are extensions of CommonLogAPI 610. Each defines an extension for a respective process of log creation, log processing and log handling.

CommonLogClientAdapterImpl 620 implements CommonLogClientAdapterAPI 612 interface forming the basis of the log adapter implementation. To accommodate differing types of logs, each log type has its own dedicated adapter. For example the CommonLogClientAuditLogAdapter 628 class is exemplary of a specific implementation for support of audit logs.

CommonLogProcessorImpl 622 implements interfaces of CommonLogProcessorAPI 614 forming the basis the log processor implementation. CommonLogProcessorImpl 622 provides the log type recognition services used to differentiate logs of one type from another. It also provides a capability to route specific log types to their respective log handlers as in those of the '63x' designation of FIG. 7. Further support may be provided in the form of log filtering allowing logs to be selected based on a particular configuration specification. (see FIG. 12 for an example)

CommonLogHandlerImpl 624 implements interfaces of CommonLogHandlerAPI 616 forming the basis for the log handlers that have been extended to handle the specific logs of the various types supported by the service. Examples of log types typically supported are shown in FIG. 7 designated as '63x'.

CommonLogMessageRendererAPI 618 provides the interfaces for the various specific log renderers. A log renderer is typically responsible for the serialization of the log message body between the object log structure and the XML format of the common or unified log.

Exemplary software of an embodiment may have AuditLogMessageRenderer 626 implemented as an extension of the interfaces of CommonLogMessageRendererAPI 618. Each different type of log would require a similar implementation of an associated log renderer, such as AuditLogMessageRenderer 626 with CommonLogMessageRendererAPI 618 being common across the renderers.

Figure 8:
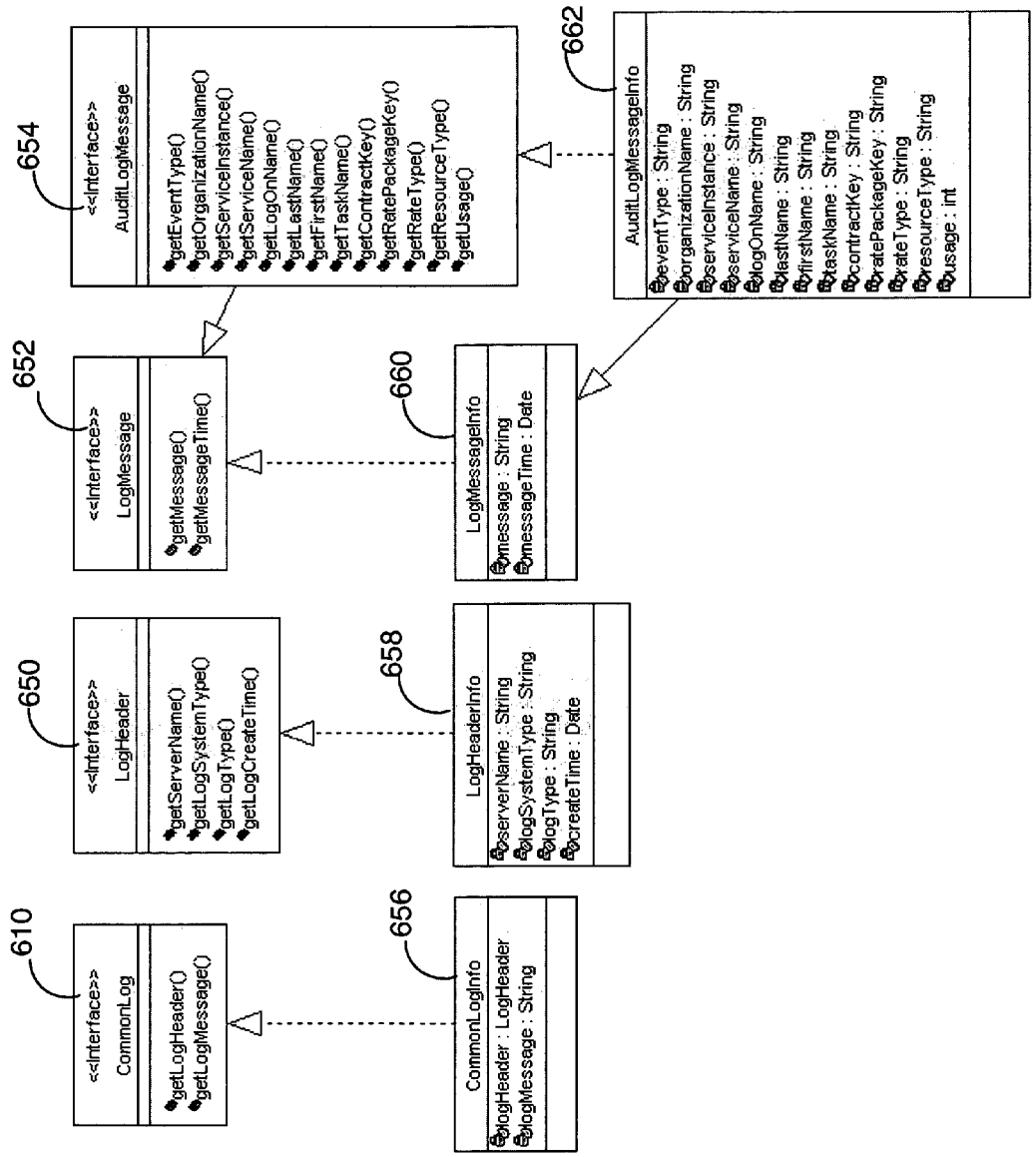
FIG. 8 is an object model diagram of an exemplary embodiment a unified log server of FIG. 3.

With reference to FIG. 8 a common logging service object model is presented. CommonLog 600 is presented again as in FIG. 7, containing the necessary high level interfaces for the service. CommonLogInfo 656 implements the interfaces of CommonLog 610, containing the log header and body information for a particular log.

LogHeader 650 is a set of interfaces defining the processing of the log header information. The supported components of the specific log will be defined in this object. LogHeaderInfo 658 implements the interfaces of LogHeader 650 containing the various components of the specific supported log header.

LogMessage 652 is a set of interfaces designed to acquire log message components from a target log. LogMessageInfo 660 implements the interfaces of LogMessage 652 allowing extensions to accommodate the various elements of the log message body.

AuditLogMessage 654 is an exemplary implementation of a set of interfaces in support of an audit type log within the unified logging services as defined. AuditLogMessageInfo 662 is implemented as a child of AuditLogMessage 654 providing necessary extensions to describe the various elements specific to the audit log message body.

FIG. 9 details exemplary code shown using XML to define a typical association of a log type to an internal processing form as used in a preferred embodiment of a unified logging service.

Each type of logs in the common or unified logging service is defined with the following attributes:

Name: log type name

Renderer: the implementation class of log renderer associated with the type of log Handlers: the list of log handlers that are registered to receive this type of logs Handler name: the name of the log handler Handler enable: the state of the log handler. Set this attribute to false to disable the log handler for the type of log.

The log system type differentiates the type of log systems from which the log files originate. Typical logs systems may be as follows, but not limited to, metering service (logs from a metering service through a metering event adapter), system web service (logs originating from a web service either directly or indirectly invoking the common logging web service interface) and application adapter (logs originating from hosted applications are sent via an application adapter.

The log type itself differentiates the nature or purpose of the log. Typical log types are, but not limited to, billing, audit, message, and trace.

FIG. 10 details exemplary code showing a sample interface invoking the common logging service through the use of a web service interface to create a log. Provision of web services is well known and will not be detailed further.

FIG. 11 is a sample of exemplary code used in an adapter of an embodiment of the common logging or unified logging service. Further is included a sample portion detailing specific inclusion of audit log adaptation. The adapter builds the common format header portion of the converted log file and the log unique message portion particular to the audit log type.

FIG. 12 is another sample of exemplary code of an embodiment of the unified logging service, but in this case it pertains to the log configuration information as used by the log processor component. The first portion of code deals with the loading of the log handler. Next the relationship between the log type and the log handler is made (in this example billing, audit), and then filtering information is provided. The filtering information is provided in the form of exclusionary information, that is the noted conditions will cause logs meeting those conditions to be not processed by the unified logging service.

In the code sample provided three log handlers are registered to the unified logging service; LogBilling Handler, LogConsoleHandler and LogDBHandler.

Each of the log types is further mapped to an appropriate log handler in a simple format such as that illustrated by the following table:

| Log Type | LogConsolehandler | LogBillingHandler | LogDBHandler |
|---|---|---|---|
| Billing | X | X | X |
| Audit | X | X | |

Further, in the example for filtering, any logs having the following format would be filtered out of the processing; a server name of "abc.xzy.com" or "pqr.xyz.com", or a log system type of "Metering Service" or WAS JRas", or log type of "Unknown", or "Billing" or "trace".

An application need not be a database management system, it may be a mail system managing a collection of mail files exploiting flat file or hierarchical file means. Typically an application is one that manages its own storage allocation and the OS file system is unaware of application structure inherent within the application managed data. All elements of the invention may reside on one machine or many. The network may or may not exist but communication among the components of the invention and between the invention and the applications is presumed to be evident. Application data may be accessed by programmatic means in conjunction with the application or unknown to the application, as a case may be made for efficiency. The agent of the invention may also provide forms of summarization and/or filtering on the data collected from the application prior to send such data to the server.

The service may be made fully symmetrical by implementing adapter and renderer function within the log consumer or receiving node to have the same capability as the sending node or log client. Additionally the log adapter and log renderer function may be implemented solely on the server portion to allow for more lightweight client support.

Although a preferred embodiment using XML as a form of describing log objects for converting to the common format has been shown it may be appreciated that other descriptive languages may be used in place. Additionally the common format is not important other than it must be capable of containing all types of desired log information.

Although publish and subscribe style of message exchange has been shown in a preferred embodiment it may be appreciated that direct addressing may also be used. In direct addressing the sending node knows the target to receiving node and need not use the publish or subscribe capability nor additional directory services.

It should be understood that the present invention contains one or more software systems. Software systems that operate in a processor or network to carry the functions described above. In this context, a software system is a collection of one or more executable software programs, and one or more storage areas (for example, RAM, ROM, cache, disk, flash memory, compact flash, EEPROM, PCMCIA, CD-ROM, CD-RW, DVD, DVD-RW, Server=s Memory etc.) In general terms, a software system should be understood to comprise a fully functional software embodiment of a function or collection of functions, which can be run on a processor or network to provide new function to that processing system or network.

It should be understood in the context of the present invention that delineations between software systems are representative of the preferred implementation. However, the present invention may be implemented using any combination or separation of software or hardware systems.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A method of providing a unified logging service, for use in a network having a plurality of nodes capable of generating event logs, wherein said unified logging service having a unified log server and repository, comprising the steps of:

converting an event log file of a first log type and structure associated with a sending node into a predefined format;

transmitting the converted event log file over the network to the unified log server;

receiving the converted event log file by the unified log server;

determining the log type of the converted log file and routing the converted log file to a log handler compatible with the log type and the predefined format;

identifying a receiving node compatible with the log type for the converted event log file, and forwarding the converted event log file from the log handler to the identified receiving node.

2. The method of claim 1, further comprising the step of: acknowledging receipt of the converted event log file by the identified receiving node to the sending node.

3. The method of claim 2, further comprising the step of: converting the acknowledgement to the predefined format.

4. The method of claim 1, further comprising the step of: storing the converted log file in the repository.

5. The method of claim 1, wherein the predefined format comprises a unified logging format including a header and a body.

6. The method of claim 5 wherein the header contains information comprising:
   a server identifier;
   a log system identifier;
   a log type identifier; and
   a log create timestamp.

7. The method of claim 5 wherein the body contains transaction information as defined by the unified logging service, comprising:
   a message portion, wherein the message portion is further defined by fields specific to the log type; and
   a time stamp portion.

8. A computer readable storage medium tangibly embodying programmed instructions for performing the method of any of claims 1 to 7.

9. An apparatus for providing a unified logging service, comprising:
   a unified logging server;
   means for receiving an event log file at the unified logging server;
   a log adapter for converting the event log file from a first structure to a predefined format;
   means for determining a log type of the converted event log file and a log handler suitable for the log type;
   means for forwarding the converted event log file to the log handler;
   means for identifying a receiving node;
   means for forwarding the converted event log file to the identified receiving node.

10. The apparatus of claim 9 further comprising:
    a repository; and
    means for storing the converted log file in the repository.

11. A system for providing a unified logging service comprising:
    a sending node having a first structure;
    an event log file having a first log type associated with the sending node;
    a log adapter for the sending node for converting the event log file from the first structure to a predefined format;
    means for transmitting the converted event log file across the network to a unified logging server;
    means for receiving the converted event log file at the unified logging server;
    means for determining the log type of the converted event log file and a log handler suitable for the log type;
    means for forwarding the converted event log file to the log handler;
    means for identifying a receiving node for the converted event log file;
    means for forwarding the converted event log file to the identified receiving node.

12. The system of claim 11 further comprising:
    means for acknowledging receipt of the converted event log file by the identified receiving node to the sending node.

13. The system of claim 11 further comprising:
    a log adapter for the receiving node for converting the predefined format to an event log file of the first structure.

14. The system of claim 12 further comprising:
    means for converting the acknowledgement to the predefined format.

15. The system of claim 11 further comprising means for storing the converted log file in the repository.

16. An article of manufacture comprising a processor useable medium having a processor readable program embodied in said medium, wherein the processor readable program when executed on or more processors causes the processors to:
    convert an event log file of a first log type and structure associated with a sending node into a predefined format;
    transmit the converted event log file onto a network to a unified log server;
    receive the converted event log file by the unified log server;
    determine the log type of the converted log file and rout the converted log file to a log handler compatible with the determined log type and the predefined format;
    identify a receiving node compatible with the log type for the converted event log file, and forward the converted event log file from the log handler to the identified receiving node.

17. The article of manufacture of claim 16, wherein the processor readable program causes one or more processors to:
    acknowledge receipt of the converted event log file by the identified receiving node.

18. The article of manufacture of claim 17, wherein the processor readable program causes one or more processors to:
    convert the acknowledgement to the predefined format.

19. The article of manufacture of claim 16, wherein the processor readable program causes one or more processors to:
    store the converted log file in the repository.

20. The article of manufacture of claim 16, wherein the predefined format comprises a unified logging format including a header and a body.

21. The article of manufacture of claim 20, wherein the header contains information comprising:
    a server identifier;
    a log system identifier;
    a log type identifier; and
    a log create timestamp.

22. The article of manufacture of claim 20, wherein the body contains transaction information as defined by the unified logging service, comprising:
    a message portion, wherein the message portion is further defined by fields specific to the log type; and
    a time stamp portion.

* * * * *